(12) United States Patent
Brooks et al.

(10) Patent No.: US 10,227,190 B2
(45) Date of Patent: Mar. 12, 2019

(54) METHODS AND APPARATUS FOR MONITORING A DOCK LEVELER

(71) Applicants: Andrew Brooks, Thiensville, WI (US); Bradley J. Stone, Port Washington, WI (US); Jason Senfleben, Hartford, WI (US); Matthew Sveum, Wauwatosa, WI (US)

(72) Inventors: Andrew Brooks, Thiensville, WI (US); Bradley J. Stone, Port Washington, WI (US); Jason Senfleben, Hartford, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/509,860

(22) Filed: Oct. 8, 2014

(65) Prior Publication Data

US 2016/0104364 A1    Apr. 14, 2016

(51) Int. Cl.
*B65G 69/00* (2006.01)
*B65G 69/28* (2006.01)

(52) U.S. Cl.
CPC .......... *B65G 69/287* (2013.01); *B65G 69/00* (2013.01); *B65G 69/2882* (2013.01)

(58) Field of Classification Search
CPC ...... G08B 21/187; G08B 21/22; B65G 69/00; B65G 69/28; B65G 69/2805;

(Continued)

(56) References Cited

U.S. PATENT DOCUMENTS 3,138,812 A    6/1964   Prosser
3,290,709 A    12/1966  Whitenack, Jr. et al.
(Continued)

FOREIGN PATENT DOCUMENTS

CA    1146309    5/1983
DE    3049611    7/1982
(Continued)

OTHER PUBLICATIONS

International Searching Authority, "International Search Report," issued in connection with Application No. PCT/US2015/054647, dated Jan. 28, 2016, 6 pages.

(Continued)

*Primary Examiner* — Van T Trieu
(74) *Attorney, Agent, or Firm* — Hanley, Flight & Zimmerman, LLC

(57) ABSTRACT

Methods and apparatus for monitoring a dock leveler are disclosed herein. One example dock leveler system for use at a doorway of a loading dock, where a body is sometimes present at the loading dock, includes a deck movable between a raised position and a lowered position. The example dock leveler system also includes a sensor having a field of view extending over the deck when the deck is in the lowered position. The sensor is in a normal state when the deck is in the lowered position while the body is off the deck, the sensor is in a triggered state when the deck is in the lowered position while the body is on the deck interrupting the field of view, and the sensor is in the triggered state when the deck is in the raised position with the deck interrupting the field of view regardless of whether the body is on or off the deck.

19 Claims, 14 Drawing Sheets

(58) Field of Classification Search
CPC ............ B65G 69/287; B65G 69/2876; B65G 69/2882; B65G 69/2888; B65G 69/2894
USPC ..................................................... 340/686.1
See application file for complete search history.

(56) References Cited

U.S. PATENT DOCUMENTS

| | | | |
|---|---|---|---|
| 3,290,710 | A | 12/1966 | Whitenack, Jr. et al. |
| 3,599,262 | A | 8/1971 | Carder et al. |
| 4,279,050 | A * | 7/1981 | Abbott ............... B65G 69/2894 14/71.3 |
| 4,727,613 | A | 3/1988 | Alten |
| 4,977,635 | A | 12/1990 | Alexander |
| 5,191,328 | A | 3/1993 | Nelson |
| 5,205,010 | A | 4/1993 | Hageman |
| 5,299,386 | A | 4/1994 | Naegelli et al. |
| 5,396,676 | A | 3/1995 | Alexander et al. |
| 5,440,772 | A * | 8/1995 | Springer ............ B65G 69/2882 14/69.5 |
| 5,586,355 | A * | 12/1996 | Metz .................. B65G 69/2882 14/69.5 |
| 5,774,920 | A | 7/1998 | Alexander |
| 5,826,291 | A | 10/1998 | Alexander |
| 5,831,540 | A | 11/1998 | Sullivan et al. |
| 6,205,721 | B1 | 3/2001 | Ashelin et al. |
| 6,233,885 | B1 | 5/2001 | Hoffmann et al. |
| 6,311,352 | B1 | 11/2001 | Springer |
| 6,499,169 | B2 | 12/2002 | Hahn et al. |
| 6,502,268 | B2 | 1/2003 | Ashelin et al. |
| 6,880,301 | B2 | 4/2005 | Hahn et al. |
| 7,045,764 | B2 | 5/2006 | Beggs et al. |
| 7,185,463 | B2 | 3/2007 | Borgerding |
| 7,213,285 | B2 | 5/2007 | Mitchell |
| 7,380,375 | B2 | 6/2008 | Maly |
| 7,954,606 | B2 | 6/2011 | Tinone et al. |
| 8,065,770 | B2 | 11/2011 | Proffitt et al. |
| 8,307,588 | B2 | 11/2012 | Hoffmann et al. |
| 8,424,254 | B2 | 4/2013 | Ballester |
| 8,547,234 | B2 * | 10/2013 | Maly .................. B65G 69/2882 14/6 |
| 8,590,087 | B2 | 11/2013 | Swessel et al. |
| 8,616,826 | B2 | 12/2013 | Cotton et al. |
| 8,678,736 | B2 | 3/2014 | Andersen et al. |
| 8,806,689 | B2 * | 8/2014 | Riviere ............... B65G 69/2882 14/69.5 |
| 8,926,254 | B2 | 1/2015 | Pocobello et al. |
| 9,284,135 | B2 | 3/2016 | Sveum |
| 9,290,336 | B2 | 3/2016 | Ballester |
| 9,830,825 | B2 | 11/2017 | Anstett |
| 2003/0145535 | A1 | 8/2003 | DiBiase et al. |
| 2004/0075046 | A1 * | 4/2004 | Beggs ........................ E06B 9/13 250/221 |
| 2006/0137261 | A1 * | 6/2006 | Maly .................. B65G 69/2882 52/36.3 |
| 2006/0266275 | A1 | 11/2006 | DiBiase et al. |
| 2007/0248440 | A1 | 10/2007 | Andersen et al. |
| 2008/0010757 | A1 | 1/2008 | Hochstein et al. |
| 2008/0042865 | A1 * | 2/2008 | Shephard ............. B65G 69/006 340/686.6 |
| 2008/0127435 | A1 * | 6/2008 | Maly .................. B65G 69/2882 14/71.1 |
| 2008/0141470 | A1 | 6/2008 | Belongia |
| 2008/0223667 | A1 | 9/2008 | Tinone et al. |
| 2009/0274542 | A1 | 11/2009 | Pocobello et al. |
| 2010/0146719 | A1 | 6/2010 | Swessel et al. |
| 2010/0269273 | A1 * | 10/2010 | Proffitt ................. B65G 69/003 14/71.3 |
| 2011/0219632 | A1 | 9/2011 | Odom |
| 2012/0025964 | A1 | 2/2012 | Beggs et al. |
| 2013/0291455 | A1 * | 11/2013 | Wiegel ................. B65G 69/003 52/173.1 |
| 2013/0320828 | A1 * | 12/2013 | Nitzsche ............... F24C 15/022 312/237 |
| 2015/0009046 | A1 * | 1/2015 | Senfleben ............... G09F 21/04 340/901 |
| 2015/0047132 | A1 * | 2/2015 | Sveum ............... B65G 69/2882 14/71.1 |
| 2015/0047133 | A1 * | 2/2015 | Sveum ............... B65G 69/2811 14/71.5 |
| 2015/0375947 | A1 * | 12/2015 | Hochstein .............. B60Q 9/002 348/143 |
| 2017/0043967 | A1 | 2/2017 | Walford et al. |
| 2017/0341514 | A1 | 11/2017 | Brooks et al. |
| 2017/0341515 | A1 | 11/2017 | Brooks et al. |
| 2017/0368939 | A1 | 12/2017 | Brooks et al. |

FOREIGN PATENT DOCUMENTS

| | | |
|---|---|---|
| EP | 2206664 | 7/2010 |
| EP | 2360110 | 8/2011 |
| EP | 2373558 | 7/2013 |
| EP | 2865622 | 4/2015 |
| GB | 2144706 | 3/1985 |
| JP | 2008307932 A * | 12/2008 |
| WO | 02070383 | 9/2002 |
| WO | 2008008699 | 1/2008 |
| WO | 2009073001 | 6/2009 |
| WO | 2010064989 | 6/2010 |
| WO | 2015166339 | 11/2015 |

OTHER PUBLICATIONS

International Searching Authority, "Written Opinion," issued in connection with Application No. PCT/US2015/054647, dated Jan. 28, 2016, 7 pages.

IFM Efector, Inc., "Image Sensor," 1998-2015, retrieved from http://www.ifm.com/ifmus/web/pmd3d-portal1.htm; http://www.ifm.com/ifmus/web/padv/020_020_010_010_010_010.html; http://www.ifm.com/ifmus/web/news/pnews_8r3n6b.html; http://www.ifm.com/ifmus/web/news/pnews_8t9jh3.html on Jan. 27, 2015, 7 pages.

Bea, "Sparrow: Unidirectional opening sensor for automatic industrial doors," Jan. 2010, last retrieved from http://www.bea-industrial.be/uploads/docs/manuals/ug_sparrow_en_v1.pdf, on Jan. 27, 2015, 2 pages.

Bea, "Sparrow: Opening Sensor for Industrial Doors Commercial sheet," last retrieved from http://www.bea-industrial.be/uploads/docs/product_sheets/ind_cs_sparrow_en_v1_web.pdf, on Jan. 27, 2015, 2 pages.

Bea, "LZR—I100/-I110 Laser Scanners for Industrial Doors," May 2011, last retrieved from http://www.bea-industrial.be/uploads/docs/manuals/ug_lzr-100-110_en_v5.pdf, on Jan. 27, 2015, 12 pages.

Bea, "LZR—i100 Safety Sensor for Industrial Doors Commercial sheet," last retrieved from http://www.bea-industrial.be/uploads/docs/product_sheets/ind_cs_LZR-i100_en_v1_web.pdf, on Jan. 27, 2015, 2 pages.

Bea, "LZR—i110 Safety Sensor for Industrial Doors Commercial sheet," last retrieved from http://www.bea-industrial.be/uploads/docs/product_sheets/ind_cs_LZR-i110_en_v1_web.pdf, on Jan. 27, 2015, 2 pages.

Bea, "Falcon/-XL Opening sensor for automatic industrial doors," last retrieved from http://www.bea-industrial.be/uploads/docs/manuals/ug_falcon_en_v3.pdf, on Jan. 27, 2015, 2 pages.

Bea, "Falcon: Opening Sensor for Industrial Doors Commercial sheet," last retrieved from http://www.bea-industrial.be/uploads/docs/product_sheets/ind_cs_falcon_falconxl_en_v1_web.pdf, on Jan. 27, 2015, 2 pages.

Bea, "LZR i30 Safety Sensor for Industrial Doors," Nov. 22, 2013, last retrieved from http://www.beainc.com/wp-content/themes/bea/documents/79.0006.04.EN%20LZR-i30%2020131122.pdf, on Jan. 27, 2015, 2 pages.

Pepperl & Fuchs, "Ultrasonic sensor UC4000-30GM-IUR2-V15 Technical data," Aug. 12, 2014, last retrieved from http://files.pepperl-fuchs.com/selector_files/navi/productInfo/edb/104094_eng.pdf on Jan. 27, 2015, 5 pages.

Pepperl & Fuchs, "Multi-Ray LED Scanner OMD8000-R2100-R2-2V15 Dimensions," Sep. 25, 2014, last retrieved from http://files.pepperl-fuchs.com/selector_files/navi/productInfo/edb/264888_eng.pdf, on Jan. 27, 2015, 3 pages.

(56) References Cited

OTHER PUBLICATIONS

International Searching Authority, "International Preliminary Report on Patentability," issued in connection with PCT Application No. PCT/US2015/054647, dated Apr. 20, 2017, 9 pages.
Crawford, "Crawford Docking Equipment Product Datasheet," last retrieved from [http://www.crawfordsolutions.com.sa//AAES/crawford solutionsCOM/EN/Products/Docking/Dock%20levellers/Docking%20equipment/1.%20Product%20datasheet/PD_DEQP_ALL_EN_ORG.pdf]on Jun. 16, 2015, 16 pages.
"Redacted Proposal Dock Equipment Automation," Jul. 9, 2013, 10 pages.
International Bureau, "International Preliminary Report on Patentability," issued in connection with International Application No. PCT/US2014/050716, dated Feb. 25, 2016, 9 pages.
International Bureau, "International Preliminary Report on Patentability," issued in connection with International Application No. PCT/US2014/050721, dated Feb. 25 2016, 10 pages.
International Bureau, "International Preliminary Report on Patentability," issued in connection with International Patent Application No. PCT/US2015/038311, dated Jan. 19, 2017, 8 pages.
International Searching Authority, "International Search Report," issued in connection with International Patent Application No. PCT/US2015/038311, dated Oct. 16, 2015, 3 pages.
International Searching Authority, "Written Opinion," issued in connection with International Patent Application No. PCT/US2015/038311, dated Oct. 16, 2015, 3 pages.
International Searching Authority, "International Search Report," issued in connection with International Patent Application No. PCT/US2014/050716, dated Dec. 11, 2014, 6 pages.
International Searching Authority, "Written Opinion," issued in connection with International Patent Application No. PCT/US2014/050716, dated Dec. 11, 2014, 6 pages.
International Searching Authority, "International Search Report," issued in connection with International Patent Application No. PCT/US2014/050721, dated Dec. 11, 2014, 6 pages.
International Searching Authority, "Written Opinion," issued in connection with International Patent Application No. PCT/US2014/050721, dated Dec. 11, 2014, 8 pages.
United States Patent and Trademark Office, "Non-Final Office Action," issued in connection with U.S. Appl. No. 14/204,987, dated Jan. 14, 2015, 6 pages.
United States Patent and Trademark Office, "Non-Final Office Action," issued in connection with U.S. Appl. No. 14/204,987, dated Jun. 25, 2015, 8 pages.
United States Patent and Trademark Office, "Requirement for Restriction and/or Election," issued in connection with U.S. Appl. No. 14/204,987, dated Oct. 3, 2014, 8 pages.
United States Patent and Trademark Office, "Notice of Allowance and Fee(s) Due," issued in connection with U.S. Appl. No. 14/204,987, dated Nov. 5, 2015, 6 pages.
United States Patent and Trademark Office, "Advisory Action," issued in connection with U.S. Appl. No. 13/965,730, dated Jan. 7, 2015, 3 pages.
United States Patent and Trademark Office, "Examiner's Answer," issued in connection with U.S. Appl. No. 13/965,730, dated Aug. 26, 2015, 11 pages.
United States Patent and Trademark Office, "Non-Final Office Action," issued in connection with U.S. Appl. No. 13/965,730, dated Dec. 19, 2013, 10 pages.
United States Patent and Trademark Office, "Final Office Action," issued in connection with U.S. Appl. No. 13/965,730, dated Apr. 7, 2014, 6 pages.
United States Patent and Trademark Office, "Non-Final Office Action," issued in connection with U.S. Appl. No. 13/965,730, dated Jul. 18, 2014, 6 pages.
United States Patent and Trademark Office, "Final Office Action," issued in connection with U.S. Appl. No. 13/965,730, dated Oct. 29, 2014, 6 pages.
United States Patent and Trademark Office, "Notice of Allowance and Fee(s) Due," issued in connection with U.S. Appl. No. 13/965,730, dated Dec. 28, 2017, 5 pages.
United States Patent and Trademark Office, "Non-Final Office Action," issued in connection with U.S. Appl. No. 14/752,332, dated Jun. 2, 2016, 10 pages.
United States Patent and Trademark Office, "Final Office Action," issued in connection with U.S. Appl. No. 14/752,332, dated Nov. 7, 2016, 11 pages.
United States Patent and Trademark Office, "Notice of Allowance and Fee(s) Due," issued in connection with U.S. Appl. No. 14/752,332, dated Jun. 21, 2017, 10 pages.
United States Patent and Trademark Office, "Non-Final Office Action," issued in connection with U.S. Appl. No. 15/682,235, dated Apr. 4, 2018, 14 pages.
United States Patent and Trademark Office, "Non-Final Office Action," issued in connection with U.S. Appl. No. 15/682,262, dated Apr. 3, 2018, 16 pages.
United States Patent and Trademark Office, "Non-Final Office Action," issued in connection with U.S. Appl. No. 15/682,216, dated Apr. 3, 2018, 16 pages.
United States Patent and Trademark Office, "Non-Final Office Action," issued in connection with U.S. Appl. No. 15/682,250, dated Apr. 4, 2018, 21 pages.
Canadian Intellectual Property Office, "Office Action," issued in connection with Canadian Patent Application No. 2,953,708, dated Jan. 18, 2018, 4 pages.
European Patent Office, "Communication pursuant to Rules 161(1) and 162 EPC," issued in connection with European Patent Application No. 15790719.7, dated May 16, 2017, 2 pages.
European Patent Office, "Communication pursuant to Rules 161(1) and 162 EPC," issued in connection with European Patent Application No. 15745012.3, dated Feb. 15, 2017, 2 pages.
European Patent Office, "Communication pursuant to Article 94(3) EPC," issued in connection with European Patent Application No. 15745012.3, dated Mar. 29, 2018, 6 pages.
IP Australia, "Notice of Acceptance," issued in connection with Australian Patent Application No. 2015288224, dated Dec. 8, 2017, 4 pages.
IP Australia, "Examination Report No. 1," issued in connection with Australian Patent Application No. 2015288224, dated Oct. 10, 2017, 5 pages.
Canadian Intellectual Property Office, "Office Action," issued in connection with Canadian Patent Application No. 2,919,890, dated Dec. 9, 2016, 4 pages.
Canadian Intellectual Property Office, "Office Action," issued in connection with Canadian Patent Application No. 2,919,890, dated Jul. 31, 2017, 4 pages.
Canadian Intellectual Property Office, "Office Action," issued in connection with Canadian Patent Application No. 2,919,891, dated Dec. 16, 2016, 4 pages.
Canadian Intellectual Property Office, "Office Action," issued in connection with Canadian Patent Application No. 2,919,891, dated Sep. 1, 2017, 3 pages.
United States Patent and Trademark Office, "Non-Final Office Action," issued in connection with Application No. 14/752,332, dated Feb. 24, 2017, 12 pages.

\* cited by examiner

METHODS AND APPARATUS FOR MONITORING A DOCK LEVELER

FIELD OF THE DISCLOSURE

The present disclosure relates generally to monitoring systems and, more specifically, to methods for monitoring a dock leveler deck.

BACKGROUND

Typical loading docks provide an area for vehicles (e.g., trucks, trailers, etc.) to back up next to an elevated platform of a building so that cargo can be readily transferred between the vehicle and the building. Some loading docks include equipment such as dock levelers, vehicle restraints and/or various sensors. Dock levelers provide an adjustable bridge over which material handling equipment can travel between the platform and the vehicle's truck or trailer bed. Some example vehicle restraints have barriers that engage some part of the vehicle to help prevent the vehicle from prematurely driving away from the platform.

DETAILED DESCRIPTION

Example dock leveler systems and methods disclosed herein detect the presence of personnel in an area adjacent a door of a loading dock. In some examples, the example dock leveler systems and methods disclosed herein employ a sensor (e.g., a touchless sensor) to detect or determine the presence of a potential obstruction on a deck of the dock leveler system and/or whether the deck of the dock leveler system is at desired predetermined elevation. In some examples, the dock leveler systems and methods determine when the deck is raised to an elevation relative to a vehicle sufficient to allow a lip of the dock leveler system to be extended between a stored position and a deployed position (e.g., to be extended from a front edge of the deck) without interference with a lower rear edge of a vehicle parked at the loading dock. In some examples, the dock leveler systems and methods disclosed herein determine whether an incline of the deck is at an angle greater than (e.g., that may be too steep relative to) a minimum angle required for certain material handling equipment to traverse the deck such as, for example, automatic guided vehicles. In some examples, the dock leveler systems and methods disclosed herein determine whether a cargo door of a vehicle is in open position or a closed position when the vehicle is parked at the loading dock.

Figure 1:
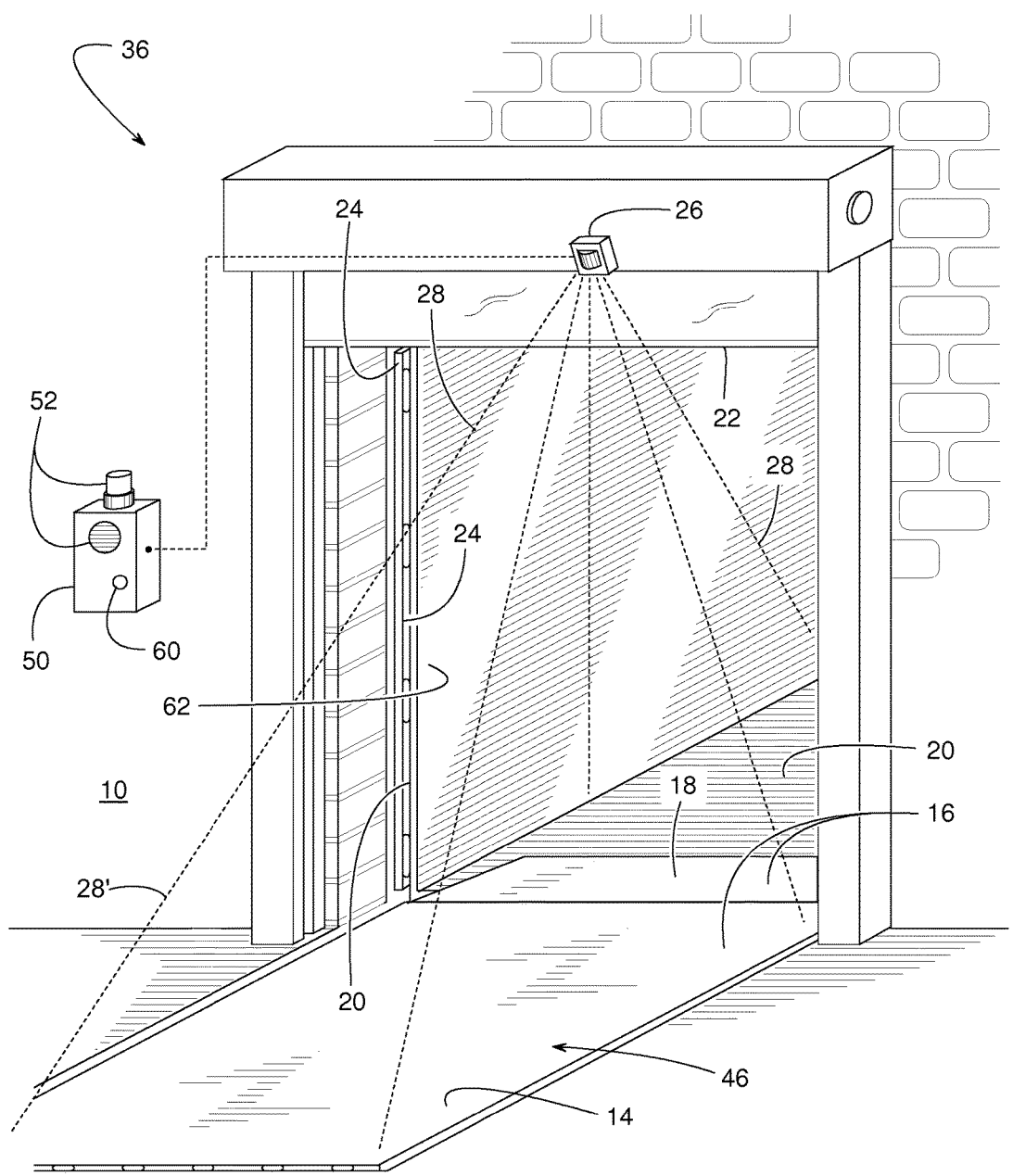
FIG. 1 is a perspective view of an example dock leveler system constructed in accordance with the teachings disclosed herein.
Figure 2:
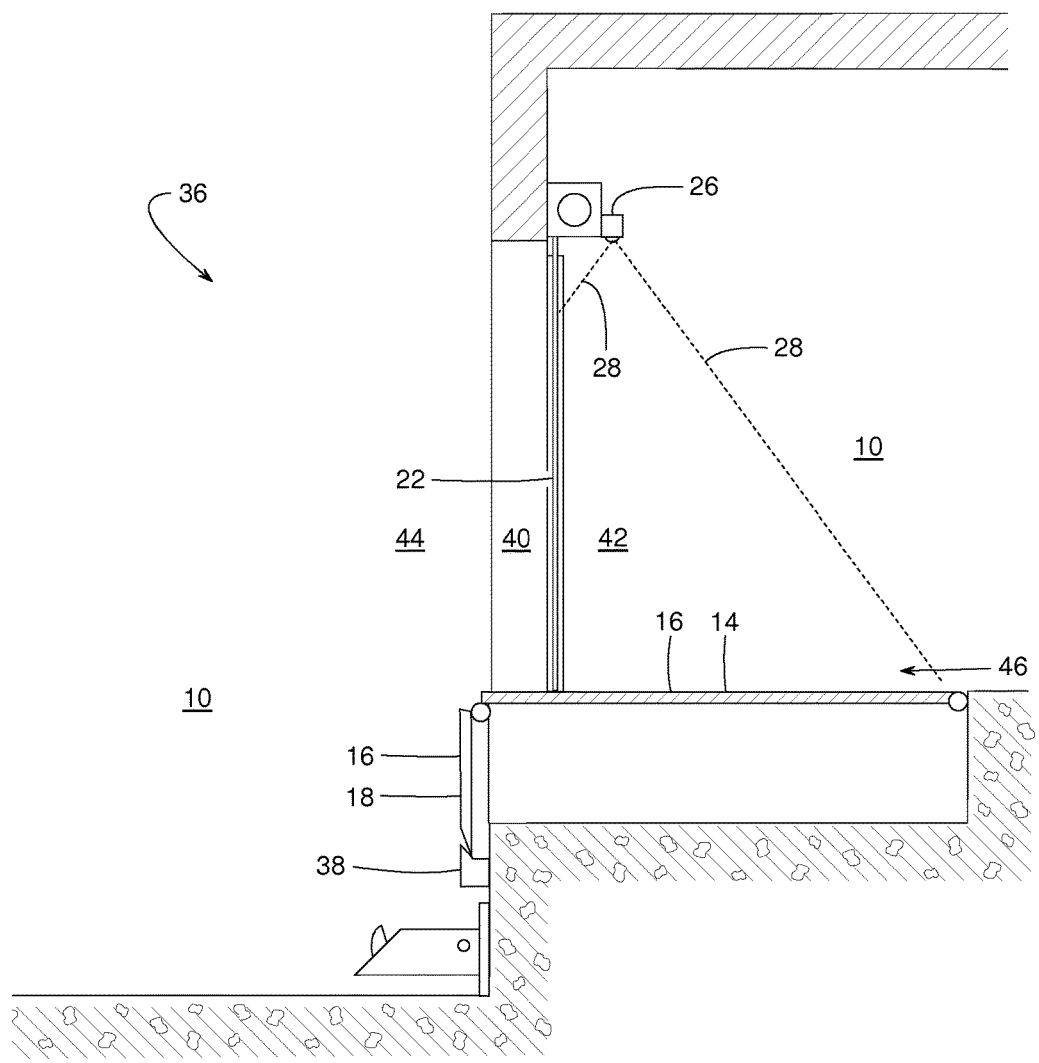
FIG. 2 is a side view of the example dock leveler system shown in FIG. 1.
Figure 3:
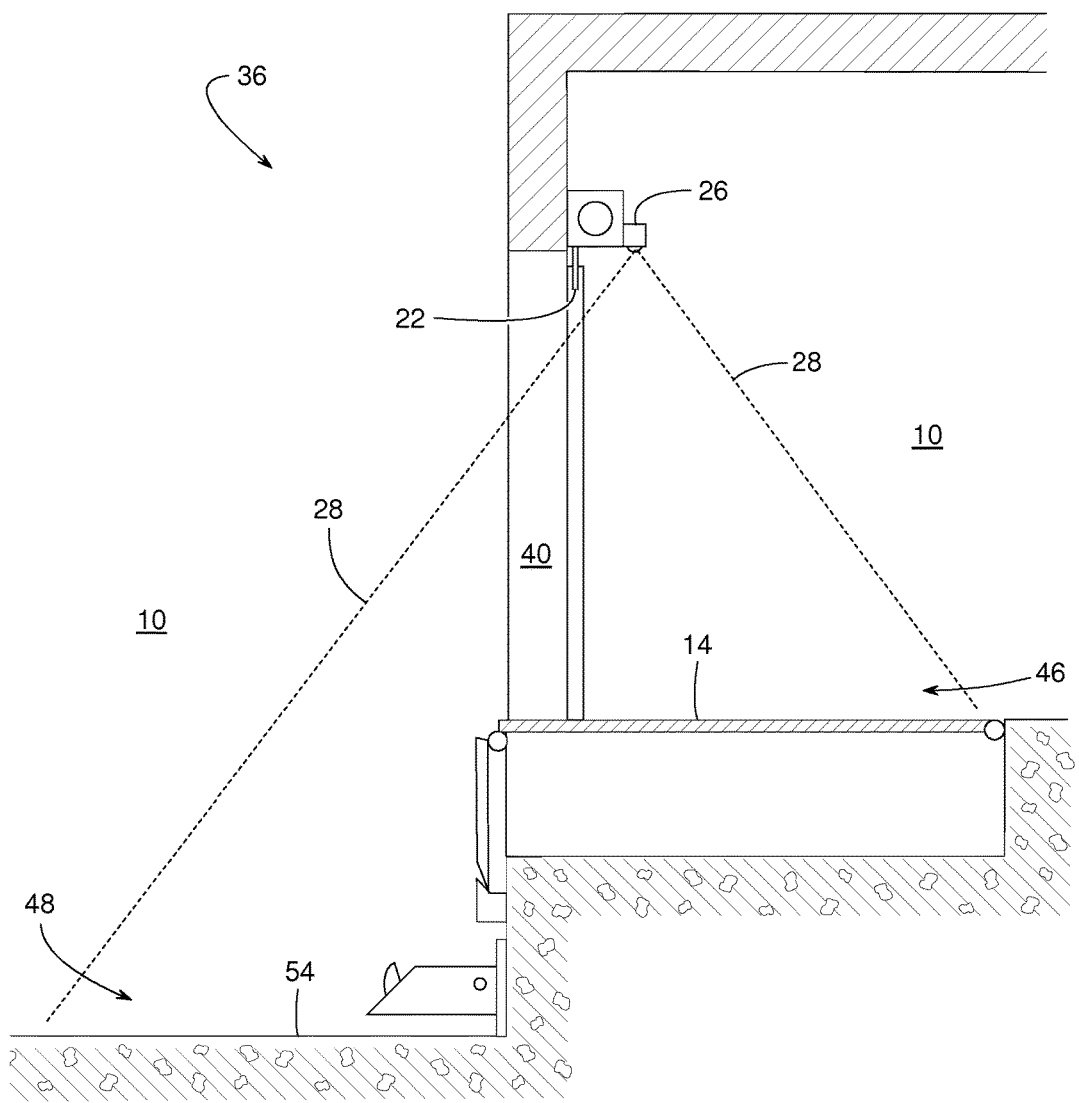
FIG. 3 is a side view similar to FIG. 2 but showing a door of an example loading dock in an open position.
Figure 4:
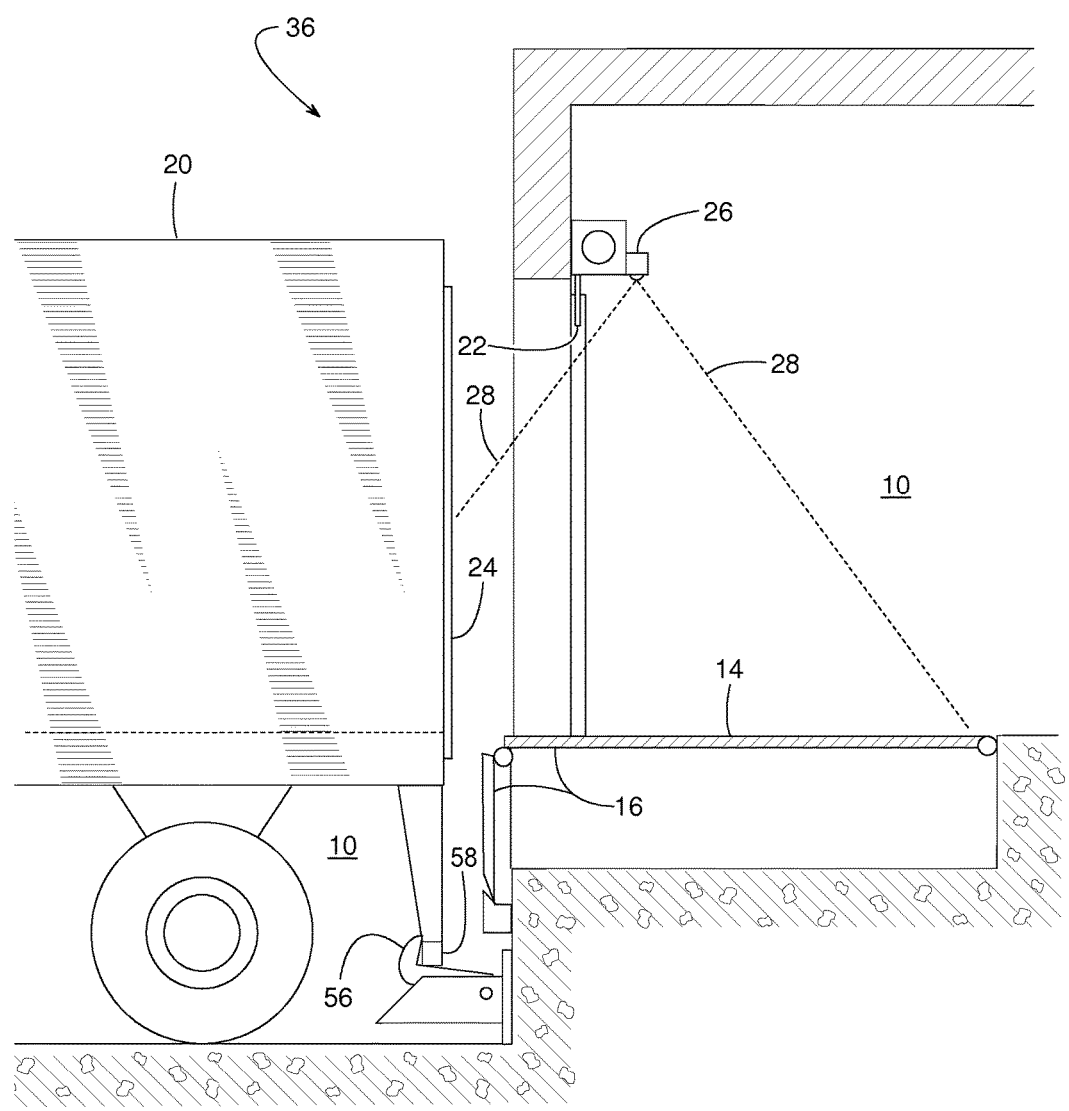
FIG. 4 is a side view similar to FIG. 3 but showing an example vehicle at the example loading dock.

FIGS. 1-10 show example dock leveler systems and methods to (e.g., touchlessly) monitor and determine various conditions at a loading dock 10. Examples of such conditions include, but are not limited to, whether a body 12 (e.g., a person, an object, a material handling equipment, etc.—see example in FIG. 5) is present at the loading dock. For example, the example dock leveler systems disclosed herein detect or determine an obstruction on a deck 14 of a dock leveler 16. In some examples, the example dock leveler systems disclosed herein detect or determine whether the deck 14 is elevated to a position sufficient to enable a lip 18 of the deck 14 to extend (e.g., to a fully extended or deployed position) without interfering with a vehicle 20 parked at the loading dock 10. In some examples, the example dock leveler systems disclosed herein detect or determine whether the deck 14 is positioned at an angle (e.g., relative to horizontal) that is greater than a minimum angle (e.g., that is too elevated or excessively inclined) to receive certain material handling equipment (e.g., a laser guided vehicle, an automatic guided vehicle, a forklift, etc.). In some examples, the example dock leveler systems disclosed herein detect or determine whether a dock door 22 of the loading dock 36 is an open position allowing access to an exterior of a building or a closed position restricting access to the exterior of the building. In some examples, the example dock leveler systems disclosed herein detect or determine whether a rear cargo door 24 of the vehicle 20 is in an open position (e.g., as shown in FIGS. 1 and 5-10) or a closed position (e.g., as shown in FIG. 4).

FIGS. 1-9 show an example elevated sensor 26 (e.g., an optical sensor) with a (e.g., three-dimensional—3D) field of view 28 to (e.g., touchlessly) monitor certain areas of the loading dock 10. In addition or alternatively, FIG. 10 shows an example lower sensor 30 with a (e.g., two-dimensional—2D) field of view 32 to (e.g., touchlessly) monitor certain areas of the loading dock 10. The term "touchlessly" refers to a sensor being able to sense certain physical conditions without having to actually contact (e.g., directly contact) the physical features associated with the condition. For example, a sensor touchlessly detecting the elevation of a dock leveler deck does so without having to actually contact the deck or having to contact an actuator associated with the dock leveler deck. As a result, the example dock leveler systems disclosed herein do not employ limit switches to detect a position (e.g., an upright position or a stored position) of the deck 14.

The example sensor 26 of FIGS. 1-9 is schematically illustrated to represent any sensor capable of monitoring, for example, 3D areas. Examples of the sensor 26 include, but are not limited to, a 3D imaging sensor (e.g., as provided by IFM Electronic of Essen, Germany), a still camera with image analytics, a video camera with video analytics, an ultrasonic sensor, a 3D scanner, etc. Examples of the sensor 26 operate under various known principles, examples of which include, but are not limited to, active infrared, passive infrared, ultrasonic, radar, microwave, laser, electromagnetic induction, ultra-IR LED, time-of-flight pulse ranging technology, photoelectric eye, thermal imaging, video analytics, and/or various combinations thereof.

The example sensor 30 of FIG. 10 is schematically illustrated to represent a sensor capable of monitoring 2D or 3D areas. Examples of the sensor 30 include, but are not limited to, an imaging sensor, a still camera with image analytics, a video camera with video analytics, an ultrasonic sensor, photoelectric eye, a 2D or 3D scanner, etc. Examples of the sensor 30 operate under various known principles, examples of which include, but are not limited to, active infrared, passive infrared, ultrasonic, radar, microwave, laser, electromagnetic induction, ultra-IR LED, time-of-flight pulse ranging technology, photoelectric, thermal imaging, video analytics, and various combinations thereof. Some examples of sensor 30 include, but are not limited to, a model BEA LZR, a model BEA Sparrow, a model BEA Falcon, a model LZR-i100, a model BEA LZR-i30, a model UC4000 Ultrasonic Sensor, and a model R2100 Multi-Beam LED Scanner. The BEA LZR examples are products of BEA Industrial of Belgium, and the R2100 and the UC400 examples are products of Pepperl & Fuchs of Germany.

In some examples, the sensor 26 and/or the sensor 30 emits and/or receives one or more beams 28' (FIGS. 4-8) or 34 (FIG. 10) of electromagnetic radiation (e.g., visible light, invisible light, infrared, laser, microwave, thermal, etc.) through its field of view 28 or 32. In some examples, one or more beams 28' and/or 34 of the respective sensors 26 and 30 extend through and/or sweep across the respective field of views 28 and 32.

In some examples, as shown in FIGS. 1-9, an example dock leveler system 36 operates under various conditions. FIG. 2 shows the deck 14 in a lowered position (e.g., cross-traffic position) with the lip 18 in a retracted or pendant position. In this example, lip keepers 38 help support the weight of the lip 18 and/or the deck 14. FIG. 2 also shows the dock door 22 in a closed position blocking a dock doorway 40 between an interior 42 and an exterior 44 of the loading dock 10. The sensor 26 monitors an area 46 above the deck 14 and, in the example illustrated in FIGS. 1-9, also monitors an area 48 (e.g., see FIG. 3) in front of the deck 14. In this example, the dock door 22 being in the closed position interrupts and/or obstructs the sensor's full field of view 28. Based on the characteristic of the interruption of the sensor's field of view 28, the sensor 26 and/or a controller 50 determines that the dock door 22 is in the closed position and the deck 14 is positioned in a lowered, cross-traffic position. In some examples, the controller 50 provides a visual and/or audible signal 52 indicating a condition(s) such as, for example, the deck 14 being in the cross-traffic position.

The controller 50 is schematically illustrated to represent any suitable controller. The term, "controller" refers to a logic circuit (e.g., wiring, relays, IC circuit, computer, programmable logic controller, etc.) that emits or generates a visual signal, an audible signal and/or a machine actuating signal in response to receiving input from the sensor 26, from a manual input device (e.g., a push button), and/or from other devices (e.g., electromechanical limit switches) communicatively coupled (e.g., via a network, wire, Bluetooth, etc.). In some examples, the controller 50 processes and/or analyzes information based on one or more signals from the sensor 26 and causes an output such as, for example, generating an audible signal, a visual signal, etc. In some examples, the controller 50 is located remotely from the sensor 26. In some examples, the controller 50 and the sensor 26 are housed within a common enclosure or housing. In some examples, parts of the controller 50 are integrated within the sensor 26 while other parts are spaced apart or located remotely from the sensor 26. In some examples, the controller 50 is housed within a single enclosure. In some examples, the controller 50 is divided among multiple enclosures.

FIG. 3 shows the dock door 22 being in the open position. With the dock door 22 open, the sensor's field of view 28 extends through the dock doorway 40 toward a driveway 54 of the loading dock 10. The sensor 26 and/or the controller 50 detects or determines that the deck 14 is in the lowered position, the dock door 22 is in the open position, and/or the vehicle 20 is not present at the loading dock 10. In some examples, the controller 50 outputs or emits a signal indicating that the dock conditions are as shown in FIG. 3 in response to a signal provided by the sensor 26.

FIG. 4 is similar to FIG. 3 in that the dock door 22 is in the open position and the deck 14 is in the lowered, cross-traffic position. In FIG. 4, however, the vehicle 20 is present at the loading dock 10. As shown in the example of FIG. 4, a vehicle restraint 56 is actuated to engage the vehicle's rear impact guard 58. Although the vehicle 20 is at the loading dock 10, the sensor 26 and/or the controller 50 detects or determines that the vehicle's cargo door 24 is in the closed position based on the cargo door 24 interrupting the sensor's field of view 28. In response to the sensor 26 sensing the cargo door 24 in the closed position, the controller 50 inhibits the operation of the dock leveler 16 and/or emits an audible and/or visual signal indicating that the cargo door 24 is in the closed position.

Figure 5:
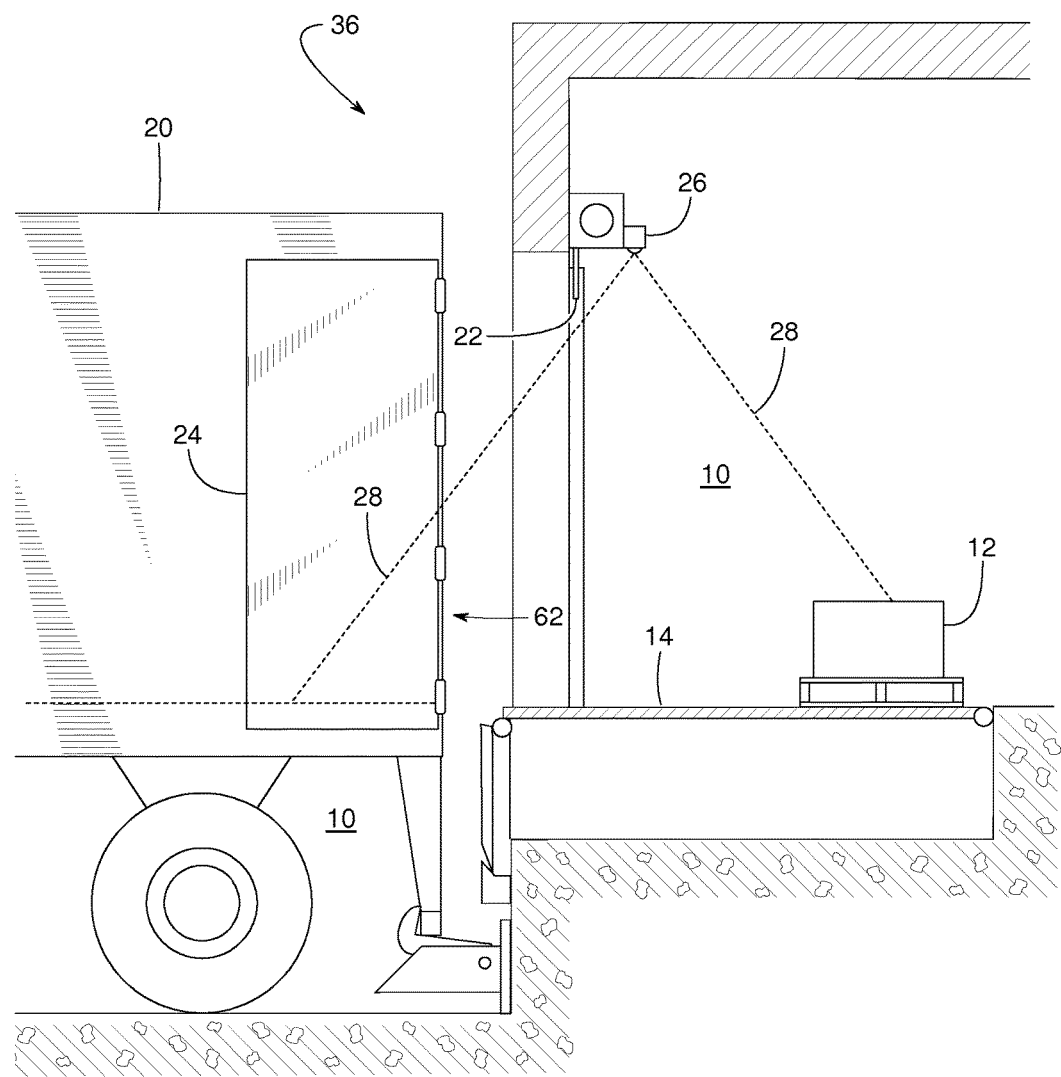
FIG. 5 is a side view similar to FIG. 4 but showing a cargo door of the example vehicle in an open position and an example obstruction positioned on the example dock leveler.

FIG. 5 shows various dock conditions such as, for instance, the deck 14 being at the lowered, cross-traffic position, an obstructive body 12 is positioned or present on the deck 14, the dock door 22 being in the open position, and the cargo door 24 being in the open position. These conditions create a characteristic or pattern of interruption of the sensor's field of view 28. In reaction to such a characteristic or pattern of interruption, the sensor 26 and/or the controller 50 detects or determines that the body 12 is present on the deck 14, the vehicle 20 is present at the loading dock 10, and both the doors 22 and 24 are their respective open positions. In some instances, the body 12 can interfere with normal loading operations. In some such examples, the controller 50 prevents the deck 14 from rising or moving toward an upright position until the sensor 26 does not detect the presence of the body 12 (e.g., until body 12 is removed). In some examples, the sensor's field of view 28 changes a sensed characteristic or pattern of interruption based on the presence or absence of the body 12. For example, a characteristic or pattern of the sensor's field of view 28 changes from a normal state when the body 12 is absent to a triggered state when the body 12 is present.

The term "normal state" refers to the sensor's output when the deck 14 is at the lowered position while body 12 is absent or not present on the deck 14. The term "triggered state" refers to the sensor's output or reaction when the sensor 26 detects a certain interruption in the field of view 28, where the interruption includes, for example, the deck 14 having moved to the raised position and/or the body 12 being on the deck 14. In examples where the sensor 26 is a camera or 3D imaging scanner, the sensor 26 is in a triggered state when the sensor's captured and analyzed image indicates that the deck 14 is at or above the raised position and/or the body 12 is present on the deck 14. In examples where the sensor 26 is a photoelectric eye or similar device, the sensor 26 is in the normal state when one or more beams 28' is unobstructed or in an uninterrupted state (e.g., the beams 28' or 34 are not interrupted by either the deck 14 or the body 12). In examples where the sensor 26 is a photoelectric eye or a similar device, the sensor 26 is in the triggered state when one or more of the beams 28' is obstructed in a pattern or characteristic indicative of the deck 14 being at or above the raised position and/or the body 12 is on the deck 14.

Figure 6:
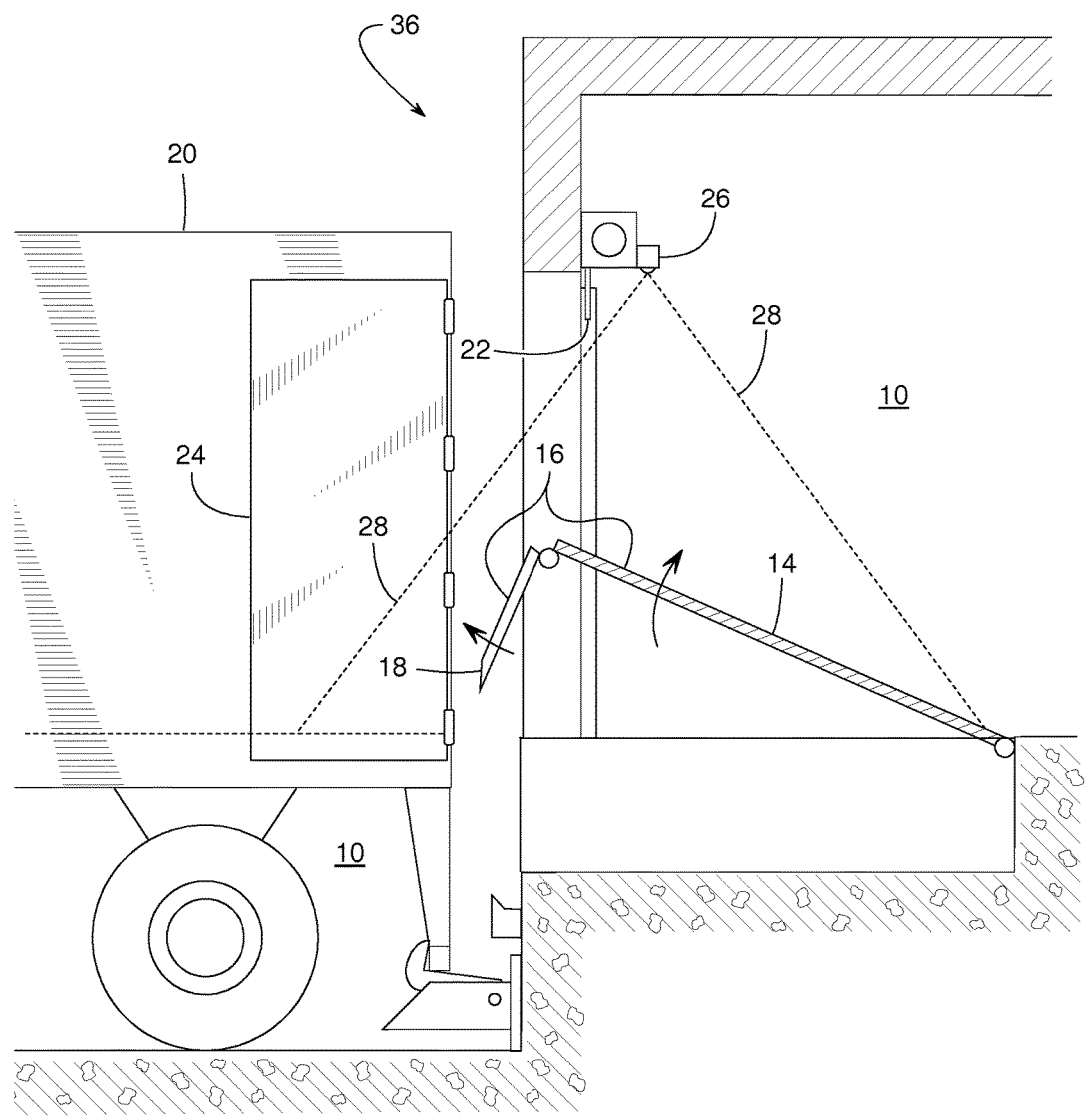
FIG. 6 is a side view similar to FIG. 5 but showing the obstruction cleared and an example deck of the example dock leveler system in an elevated position.

FIG. 6 shows that after removing the body 12, the dock leveler 16 is deployed in preparation for loading and/or unloading the vehicle 20 of cargo. In some examples, once the body 12 is removed, an actuator (e.g., a hydraulic cylinder, a linear motor, etc.) can raise the deck 14 until the sensor 26 determines that the deck 14 is at a predetermined raised position (e.g., a position shown in FIG. 6). The predetermined position should be sufficiently high to allow the extension of the lip 18 out away from the deck 14 and over the lower rear edge of the vehicle 20. The sensor 26 and/or the controller 50 determines when the deck 14 is at the predetermined raised position based on a characteristic or pattern of interruption of the sensor's field of view 28. In some examples, the sensor's field of view 28 changing due to the deck 14 moving from the lowered position to the raised position changes a condition of the sensor 26 from a normal state to a triggered state, respectively.

Once the controller 50 determines that the deck 14 has moved to the predetermined raised position, in some examples, the controller 50 (e.g., automatically) commands the lip 18 to extend or deploy. In other examples, when the controller 50 determines that the deck 14 has moved to the predetermined raised position, the controller 50 prompts manual activation of the lip 18 and the controller 50 does not cause the lip 18 to extend until the controller 50 receives an input signal 60 (e.g., a manual pushbutton activation—see FIG. 1) that commands the lip 18 to extend.

Figure 7:
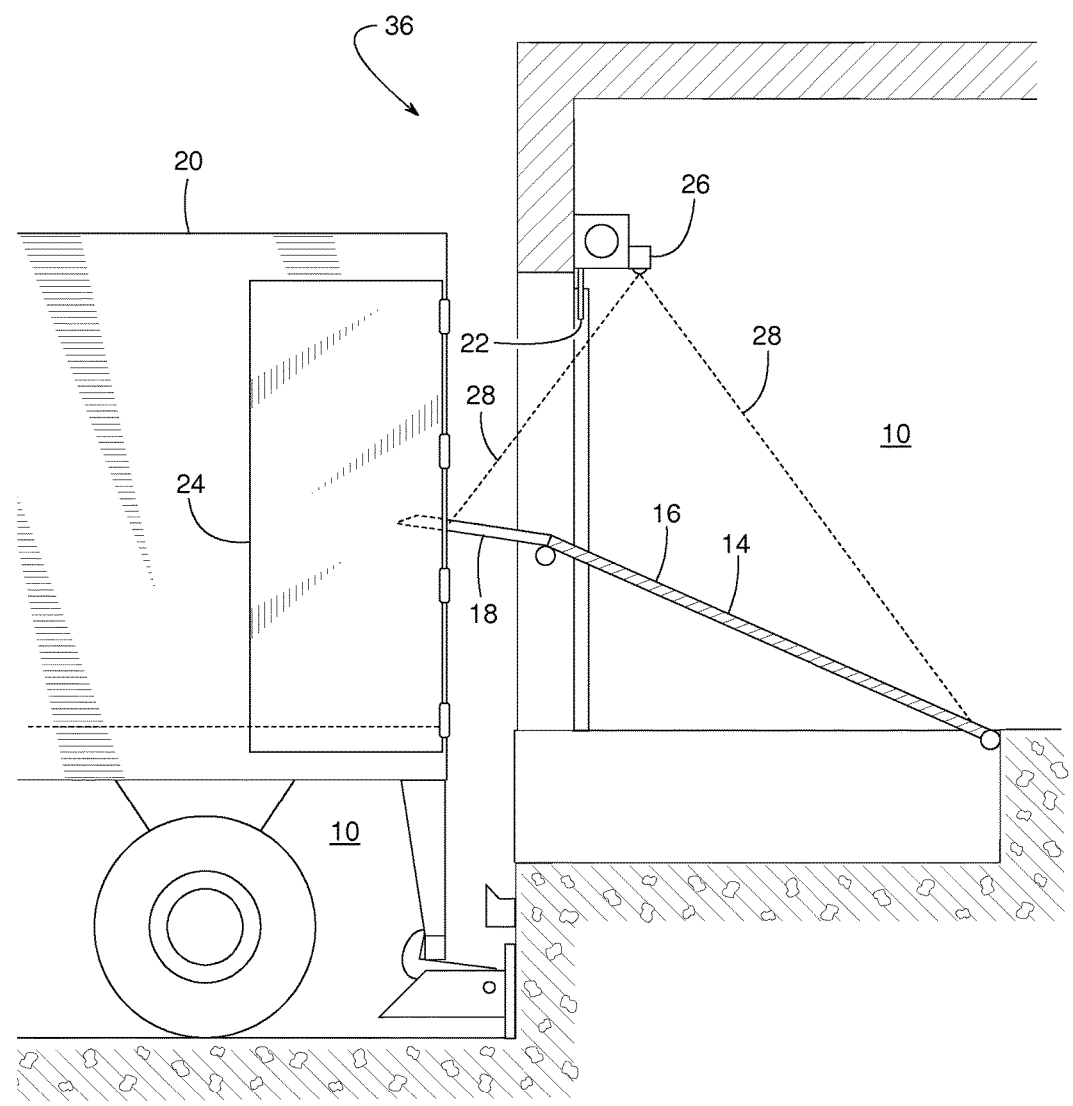
FIG. 7 is a side view similar to FIG. 6 but showing an example lip of the example dock leveler system in an extended position.

FIG. 7 shows that, in some examples, the sensor 26 senses whether the lip 18 is extended based on the lip's interruption of the sensor's field of view 28. After the lip 18 is (e.g., fully) extended via, for example, an actuator (e.g., a hydraulic cylinder, a linear motor, etc.), the deck 14 is lowered from the raised position of FIG. 7 to an operative position (e.g., sometimes another raised position, a position between the raised position and the lowered position) as shown in FIG. 8.

Figure 8:
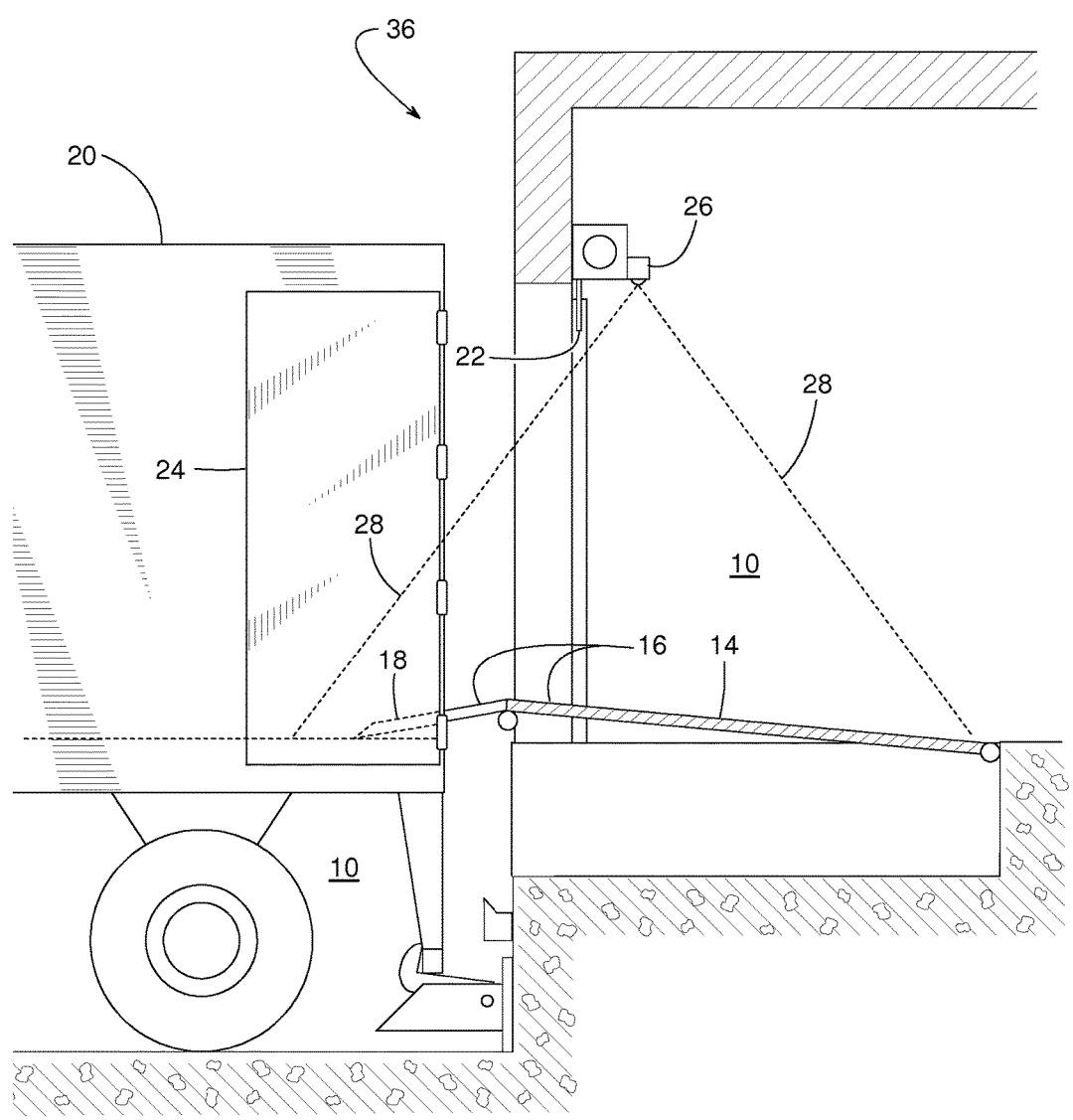
FIG. 8 is a side view similar to FIG. 7 but showing the example lip resting upon a bed of the example vehicle.

FIG. 8 shows the dock leveler 16 configured for cargo loading and/or unloading operations. Based on a characteristic or pattern of interference of the sensor's field of view 28, the sensor 26 and/or the controller 50 determines when the dock leveler 16 is properly deployed. In some examples, the controller 50 responds to the sensor 26 by emitting a signal that indicates the dock leveler 16 is ready for use.

Figure 9:
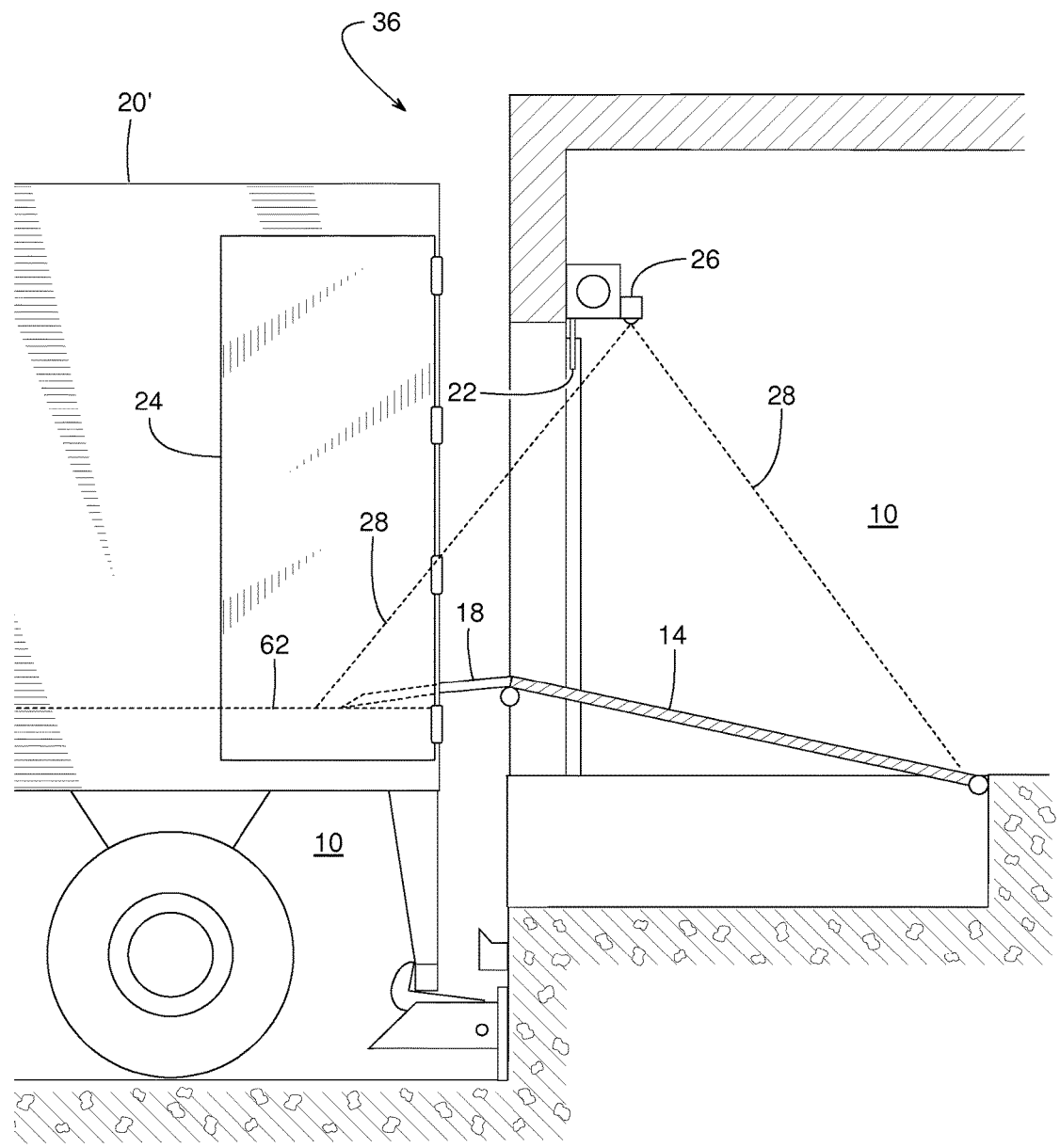
FIG. 9 is a side view similar to FIG. 8 but showing another example vehicle having a bed at a higher elevation than the example vehicle of FIGS. 4-8.
Figure 10:
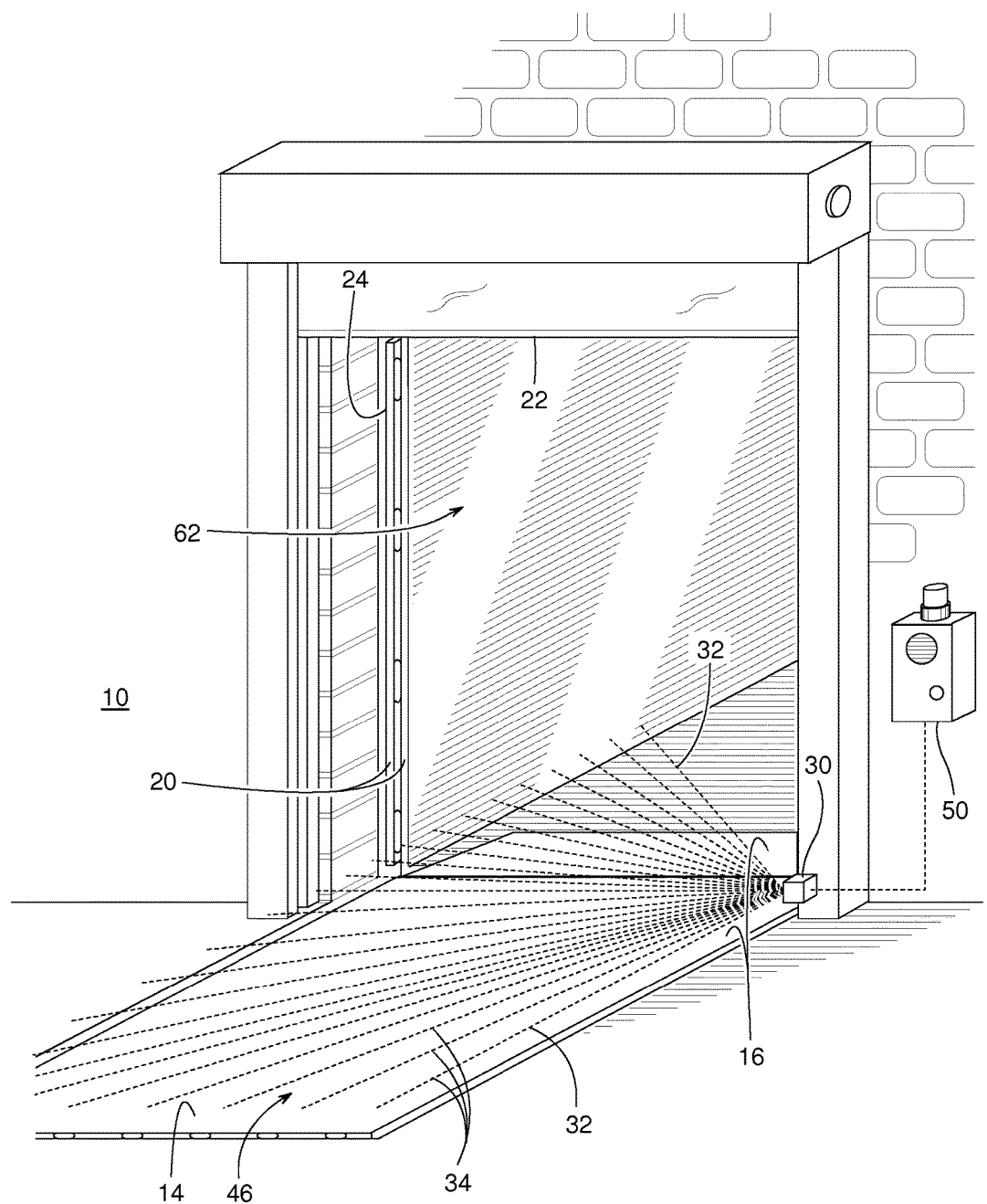
FIG. 10 is a perspective view of another example dock leveler system constructed in accordance with the teachings disclosed herein.

FIG. 9 shows that, in some examples, a relatively large vehicle 20' with a rather high truck or trailer bed 62 can supports the lip 18 and the deck 14 such that the lip is at an elevation that is significantly higher relative to a base of the deck 14 (e.g., a pivoting end of the deck 14 opposite the lip 18). As a result, an incline or slope of the deck 14 (e.g., an angle relative to horizontal or the ground between a first end of the deck 14 and the lip 18) may be too steep or high for some material handling equipment, particularly automatic guided vehicles, to traverse. As a result, such material handling equipment will have difficulty traveling up the incline of the deck 14. So, in some examples, the sensor 26 and/or the controller 50 senses and/or determines when the deck 14 is at such an extreme inclined position based on the deck's effect on the sensor's field of view 28. In some examples, the controller 50 responds to sensor 26 by emitting a signal that indicates that an incline of the deck 14 is too high for some material handling equipment.

In addition or alternatively, FIG. 10 shows the sensor 30 with field of view 32 that provides one or more lines of coverage over the deck 14. To detect the body 12 and/or the ascent of the deck 14, in some examples, the field of view 32 is defined by one or more beams 34 that lie above and/or generally parallel to the deck 14 when the deck 14 is at the lowered, cross-traffic position. In some examples, the field of view 32 extends through the dock doorways 40, through the vehicle's cargo doorway 62, and/or into the vehicle 20 (e.g., a cargo bay of the vehicle 20). In some examples, there is a plurality of beams 34 to monitor an (e.g., two-dimensional) area 46 above the deck 14. In some examples, there is a single beam 34 that scans and/or translates (e.g., horizontally) across the area 46 above the deck 14. Depending on the extent, characteristic or pattern to which the deck 14, the dock door 22 and/or the vehicle 20 interrupts the sensor's field of view 32, the sensor 30 and/or the controller 50 determines various operating conditions at the dock 10. Examples of such operating conditions include one or more operating conditions illustrated in connection with FIGS. 2-9.

Figure 11:
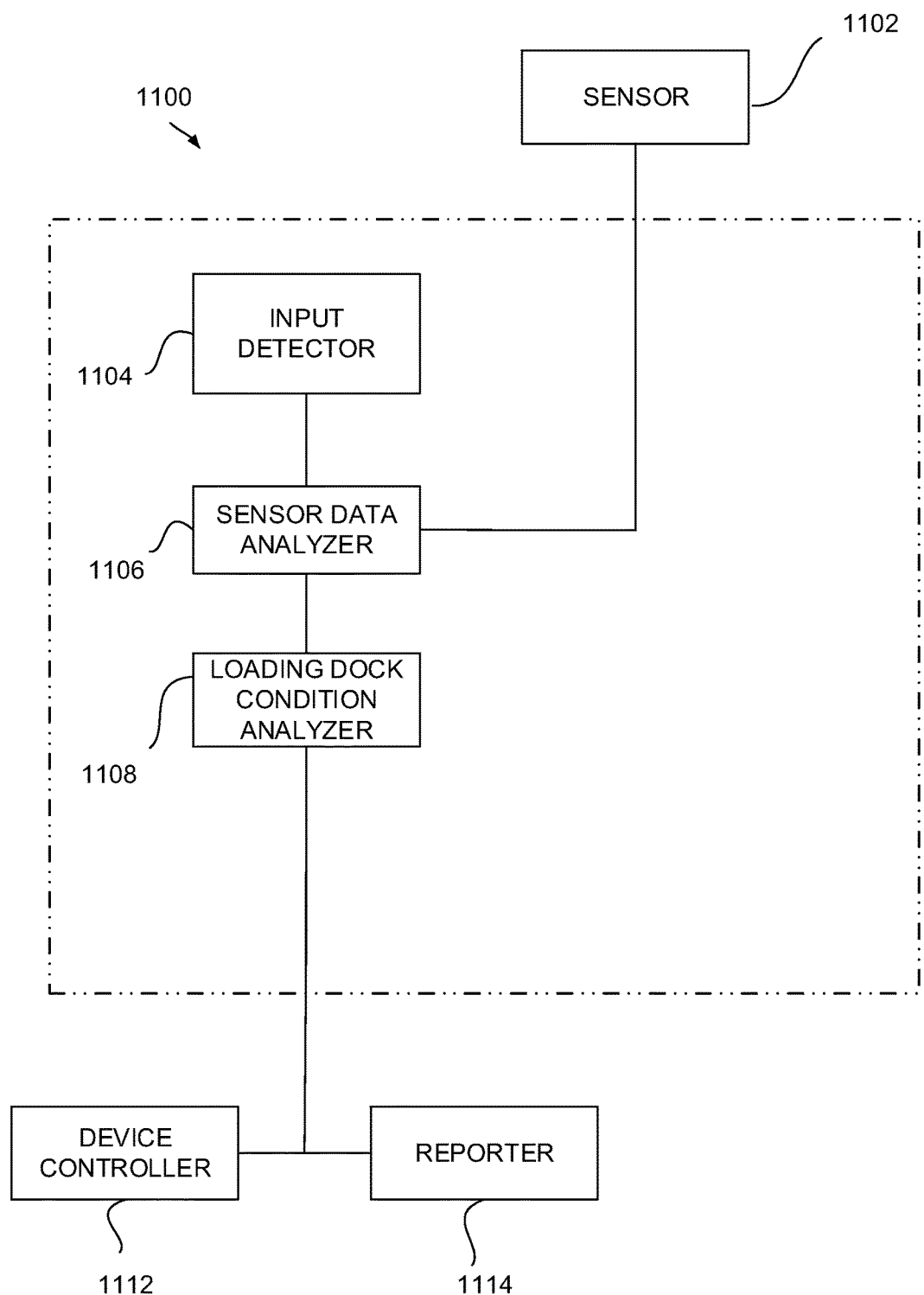
FIG. 11 is a block diagram of an example dock leveler controller constructed in accordance with the teachings of this disclosure.

FIG. 11 depicts a controller 1100 such as the controller 50 described above in connection with FIGS. 1-10 that may be used to implement the example disclosed herein. In this example, the controller 1100 is communicatively coupled to a sensor 1102 (e.g., the sensor 26) and includes an input detector 1104, a sensor data analyzer 1106, a device input analyzer 1108, an output interface 1110. In this example a device controller 1112 and a reporter 1114 are communicatively coupled to the controller 1100, but, in some examples, the device controller 1112 and/or the reporter 1114 are integral with the controller 1100. Likewise, in some examples, the sensor 1102 is integral with the controller 1100.

The sensor 1102 of the illustrated example detects information related to a condition of a loading dock. In this example, the condition relates to a position of a deck of the loading dock. Additionally or alternatively, in some examples, the condition is based on a presence of an object (e.g., a body, personnel, etc.) present on the deck, the deck moving to an upright position, the deck in the upright position, a position of a door of the loading dock (e.g., a dock door), a presence of a vehicle and/or whether a door of the vehicle is open, etc. In this example, the input detector 1104 detects input related to the controller such as a presence of the input signal 60. In this example, the sensor data analyzer 1106 receives sensor data from the sensor 1102, which is then sent to the loading dock condition analyzer 1108 to determine, define, interpret and/or analyze a condition of the loading dock. In this example, the loading dock condition analyzer 1108 signals the device controller to control a device such as an actuator, for example, on the loading dock (e.g., controls the deck). In some examples, the loading dock condition analyzer 1108 signals and/or triggers the reporter 1114 to provide an indication (e.g., the visual and/or audible signal 52) of the condition of the loading dock.

Figure 12:
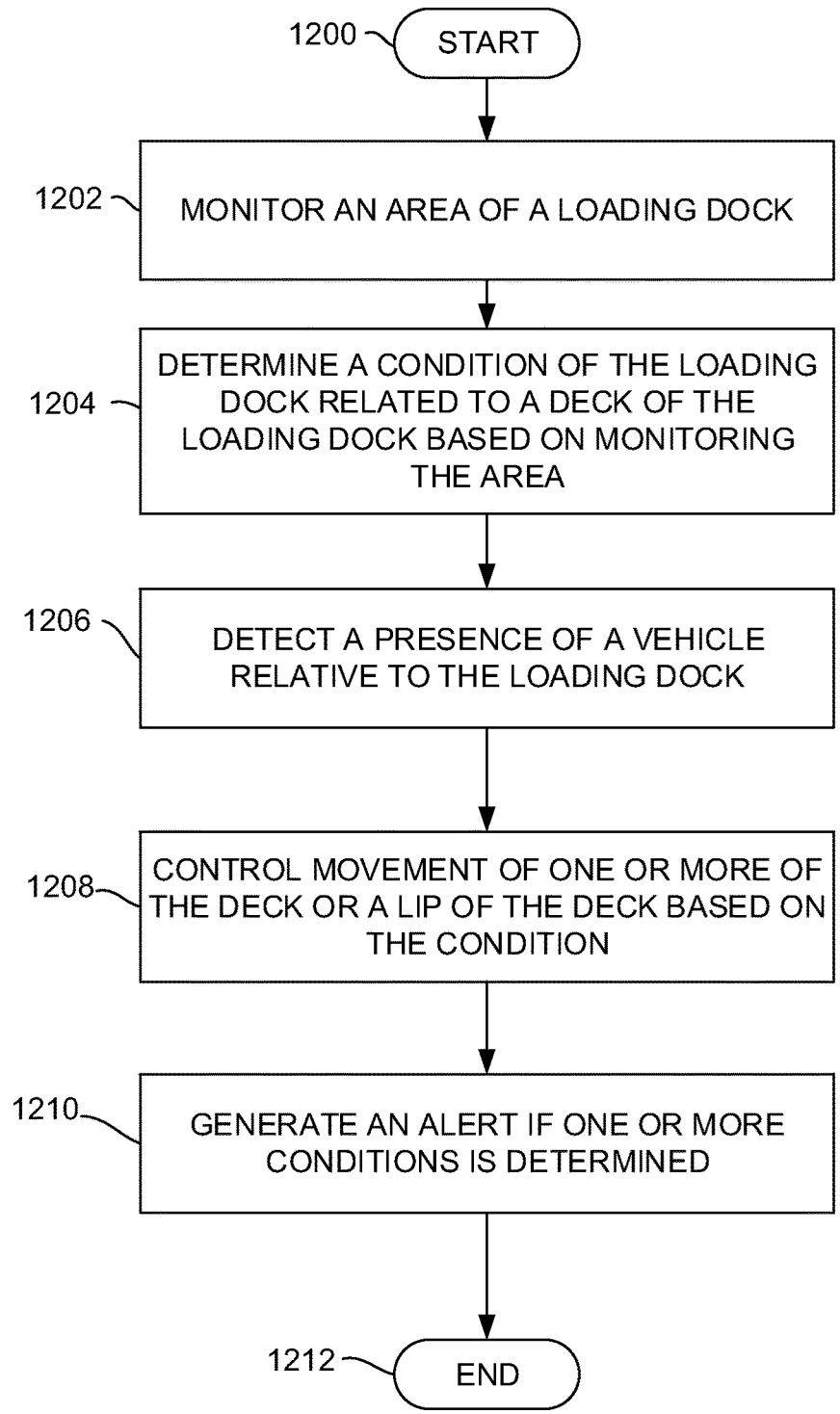
FIGS. 12-13 are flowcharts representative of example machine readable instructions that may be executed to monitor the example dock leveler system disclosed herein.
Figure 13:
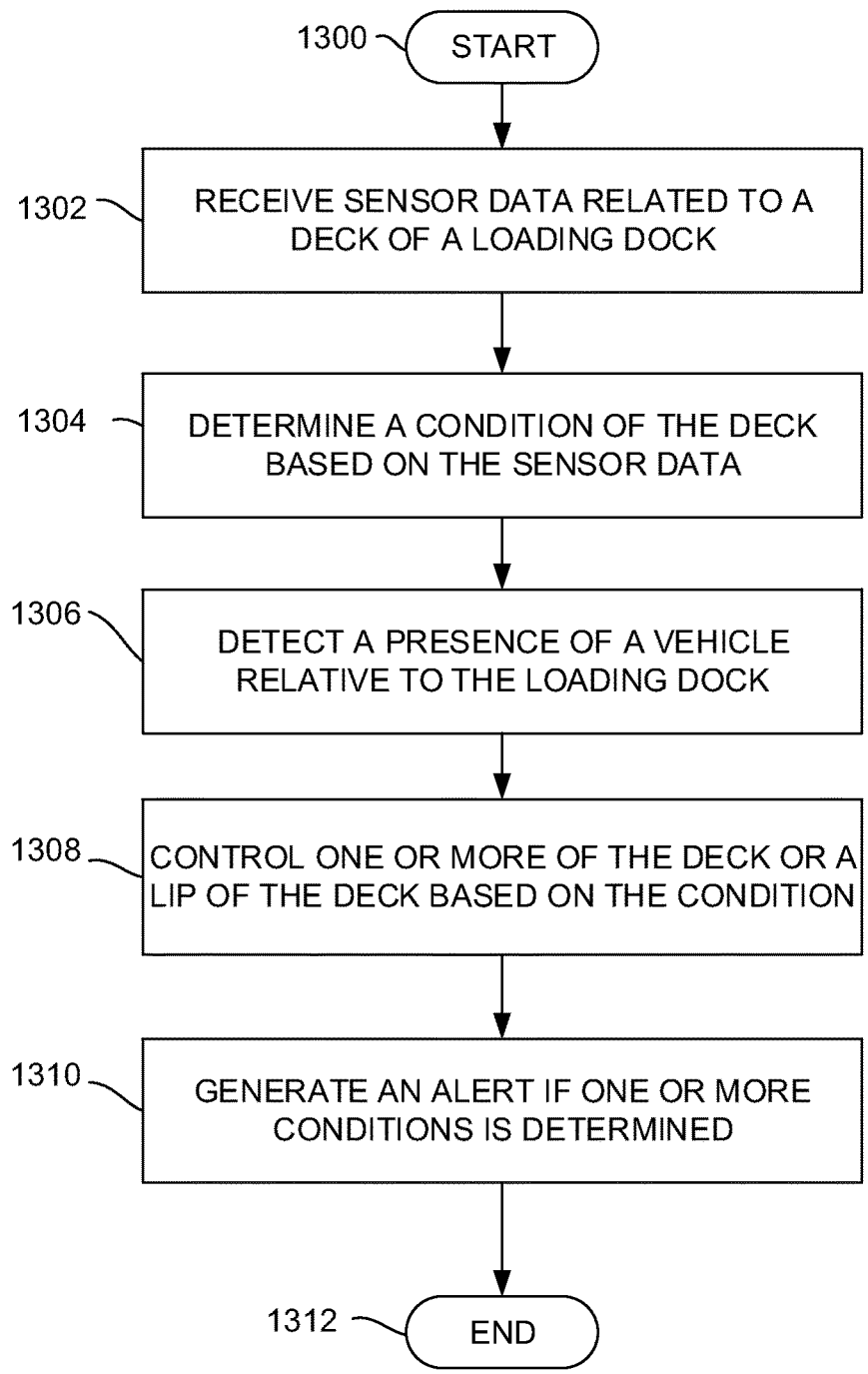

While an example manner of implementing the controller 1100 of FIG. 11 is illustrated in FIGS. 12 and 13, one or more of the elements, processes and/or devices illustrated in FIGS. 12 and 13 may be combined, divided, re-arranged, omitted, eliminated and/or implemented in any other way. Further, the example sensor 1102, input detector 1104, the example sensor data analyzer 1106, the loading dock condition analyzer 1108, the device controller 1112, the reporter 1114 and/or, more generally, the example controller 1100 of FIG. 11 may be implemented by hardware, software, firmware and/or any combination of hardware, software and/or firmware. Thus, for example, any of the example sensor 1102, input detector 1104, the example sensor data analyzer 1106, the loading dock condition analyzer 1108, the device controller 1112, the reporter 1114 and/or, more generally, the example controller 1100 of FIG. 11 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor 1102, input detector 1104, the example sensor data analyzer 1106, the loading dock condition analyzer 1108, the device controller 1112, the reporter 1114 and/or, more generally, the example controller 1100 of FIG. 11 is/are hereby expressly defined to include a tangible computer readable storage device or storage disk such as a memory, a digital versatile disk (DVD), a compact disk (CD), a Blu-ray disk, etc. storing the software and/or firmware. Further still, the example controller 1100 of FIG. 11 may include one or more elements, processes and/or devices in addition to, or instead of, those illustrated in FIGS. 12 and 13, and/or may include more than one of any or all of the illustrated elements, processes and devices.

A flowchart representative of example machine readable instructions for implementing the controller 1100 of FIG. 11 is shown in FIGS. 12 and 13. In this example, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 12 and 13, many other methods of implementing the example controller 1100 may alternatively be used. For example, the order of execution of the blocks may be changed, and/or some of the blocks described may be changed, eliminated, or combined.

As mentioned above, the example processes of FIGS. 12 and 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 12 and 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase at "least" is used as the transition term in a preamble of a claim, it is open-ended in the same manner as the term "comprising" is open ended.

The program of FIG. 12 begins at block 1200 where a loading dock is to be monitored to facilitate the removal of cargo from a vehicle, for example (block 1200). First, the sensor data analyzer 1106 (see FIG. 14) of the illustrated example receives sensor data related to a loading dock from a sensor (e.g., the sensor 26, the sensor 1102, etc.) to monitor an area of the loading dock (block 1202). In this example, the sensor is a 3D imaging scanner that captures and/or characterizes a spatial arrangement data of objects and/or known machinery or devices of the loading dock. In this example, the sensor data analyzer converts the spatial arrangement data to positional information of portions of the loading dock, a presence of objects on a deck (e.g., the deck 14) of the loading dock, and/or a presence of a vehicle at the loading dock, for example. In some examples, the sensor data is captured by a photoelectric eye or a similar device. The sensor data of the illustrated example is captured periodically. In some examples, the sensor data is received based on event-triggers such as a detection of an object on the deck.

The loading dock condition analyzer 1108 of the illustrated example uses data related to positions of components of the loading dock (e.g., a position of the deck, a position of a lip of a deck, etc.) and/or the presence of objects and/or bodies on the deck to determine a condition of the loading dock based on monitoring the loading dock (block 1204). In this example, the condition is also based on a position of a door of the loading dock, which is determined based on monitoring the area of the loading dock and/or the sensor data received. In other examples, the condition is further based on a position of a vehicle (e.g., the vehicle 36) and/or a position of the vehicle is also determined based on monitoring the area and/or sensor data received. The loading dock condition analyzer 1108 of the illustrated example periodically receives data from the sensor and, in turn, processes the data as the data is received at the sensor data analyzer 1106. In some other examples, the loading dock analyzer 1108 receives input at the input detector 1104, for example, and determination of the condition is further based on the input.

In some examples, the sensor detects a presence of a vehicle at the loading dock (block 1206). Additionally or alternatively, the sensor detects a distance of the vehicle to the loading dock. In some examples, the condition is further based on the presence of the vehicle and/or the distance of the vehicle to the loading dock.

In some examples, movement and/or displacement of the deck and/or a lip of the deck is controlled based on the sensor data and/or a condition of the loading dock determined (block 1208). In particular, the deck of the illustrated example is moved by an actuator or motor via the device controller 1112, for example. In some examples, a body or object detected on the deck prevents the deck from being moved. In some examples, the deck being at a certain elevation causes the device controller 1112 to allow the deck to move further. Additionally or alternatively, the lip of the deck is prevented from extending until the deck is determined to be at a certain position and/or displacement relative to an original position of the deck. In other examples, a docking position of the deck or a degree to which the deck and/or the lip displace is based on sensor data related to a vehicle docked and/or a vertical distance to a storage level (e.g., the trailer bed 62) of the vehicle.

In some examples, an alert is generated at the reporter 1114 if one or more conditions is determined to occur (block 1210). For example, one or more conditions triggers the visual and/or audible signal 52. In some examples the alert is generated and/or triggered by a presence of a body or object detected on the deck, the deck moving to an upright position, the deck being positioned in the upright position, the door of the loading dock being closed, a position of a door of a vehicle at the loading dock, and/or a relative displacement of a trailer bed of a vehicle to the loading dock, etc. Next, the process ends (block 1212).

The program of FIG. 13 begins at block 1300 where a deck of a loading dock is positioned in its retracted position (block 1300). In this example, sensor data related to the deck is received at the sensor data analyzer 1106 (block 1302) which, in turn, converts and/or processes the sensor data for use by the loading dock condition analyzer 1108. In this example, the loading dock condition analyzer 1108 determines a condition of the deck based on the sensor data (block 1304). In particular, the sensor data of the illustrated example is used to generate spatial relationship data of the deck including, but not limited to, a position of the deck, a position of a lip of the deck, retracting or extending position of the lip, a door of the loading dock, a ramp of the loading dock, a vehicle, a door of the vehicle, a loading surface of the vehicle and/or an object present on the deck, etc. In some examples, the determination of the condition of the deck is further based on input received at the input detector 1104.

In this example, the sensor detects a presence and/or a distance of a vehicle relative to the loading dock (1306). Once the vehicle is positioned in proximity to the deck and/or the condition of the loading dock permits deployment of the deck, for example, the deck and/or the lip of the deck is controlled via the device controller 1112 (block 1308) to the move the deck onto a flatbed of the vehicle. In this example, the spatial data generated via the sensor data is utilized to determine the relative position of the deck to the flatbed. In some examples, an alert is generated and/or displayed at the reporter 1114 (block 1310) and the process ends (block 1312).

Figure 14:
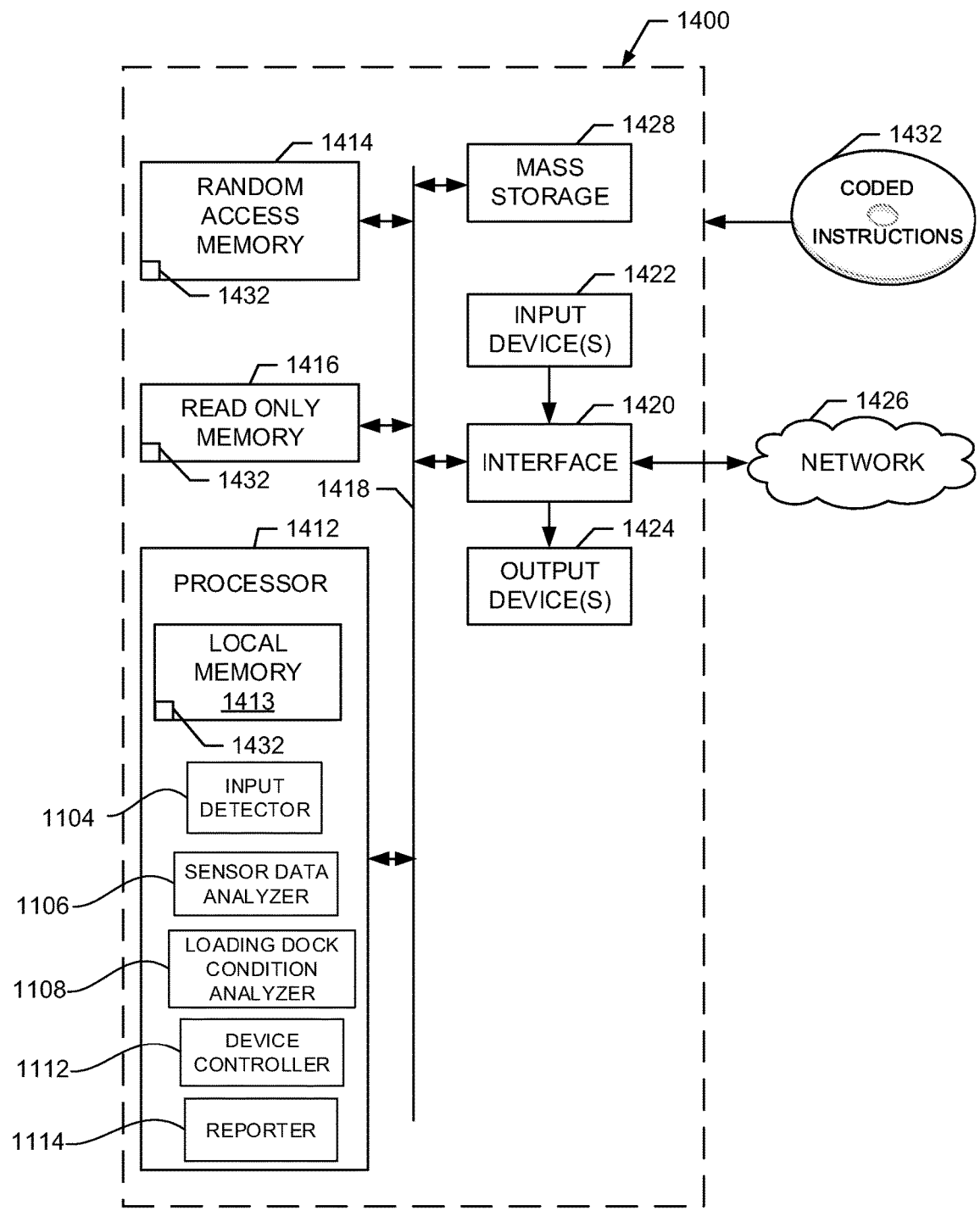
FIG. 14 is a schematic illustration of an example processor platform that may execute the instructions of FIGS. 12-13 to implement the example dock leveler controller of FIG. 11.

FIG. 14 is a block diagram of an example processor platform 1000 capable of executing the instructions of FIGS. 12 and 13 to implement the example controller 1100 of FIG. 11. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 includes the example input detector 1104, the example sensor data analyzer 1106, the example sensor data analyzer, the example loading dock condition analyzer 1108, the example device controller 1112, and the example reporter 1114. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 12 and 13 may be stored in the mass storage device 1428, in the volatile memory 1414, in the non-volatile memory 1416, and/or on a removable tangible computer readable storage medium such as a CD or DVD.

From the foregoing, it will appreciate that the above disclosed methods and apparatus to monitor and/or determine a condition of a loading dock.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A dock leveler system for use at a doorway of a loading dock, the dock leveler system comprising:
   a deck being movable between a raised position and a lowered position;
   a sensor at the loading dock, the sensor having a field of view extending over the deck when the deck is in the lowered position, the sensor to detect a position of the deck, a body on the deck, a status of a door at the doorway of the loading dock, and a status of a rear cargo door of a vehicle, the sensor having a triggered state and a non-triggered state,
   the sensor being in a non-triggered state when:
      the deck is detected in the lowered position;
      the body is not detected on the deck
      the vehicle is detected at the loading dock; and
      the rear cargo door of the vehicle is detected in an open position;
   the sensor being in the triggered state when at least one of:
      the deck is detected in the lowered position and the body is detected on the deck;
      the deck is at a predetermined position regardless of detection of the body on the deck; or
      the vehicle is detected at the loading dock and the rear cargo door of the vehicle is detected in a closed position; and
   a controller to operate the deck between the raised position and the lowered position when the sensor is in the non-triggered state, and the controller to prevent operation of the deck when the sensor is in the triggered state.

2. The dock leveler system of claim 1, wherein the sensor is to at least one of emit or receive a beam of electromagnetic radiation through the field of view, and the beam is substantially parallel to the deck when the deck is in the lowered position.

3. The dock leveler system of claim 1, wherein the sensor is to at least one of emit or receive a plurality of beams of electromagnetic radiation through the field of view, and the plurality of beams are substantially parallel to the deck when the deck is in the lowered position.

4. The dock leveler system of claim 1, wherein the sensor at least one of emits or receives a beam of electromagnetic radiation through the field of view, the beam being non-perpendicular relative to the deck when the deck is in the lowered position, and the beam being in translation to monitor a two-dimensional area above the deck when the deck is in the lowered position.

5. The dock leveler system of claim 1, wherein the field of view extends downward from the sensor toward the deck.

6. The dock leveler system of claim 1, wherein the sensor comprises a camera with the field of view extending downward from the sensor toward the deck.

7. A method comprising:
   monitoring, via a sensor to be positioned at a loading dock, an area of a loading dock to detect a status of a vehicle door of a vehicle when the vehicle is present at the loading dock, the loading dock including a deck;
   receiving, via a processor, a command to move the deck between a stored position and an operating position;
   determining, using the processor, if the status of the vehicle door of the vehicle is in at least one of an open position or a closed position;
   causing, via the processor, the deck to move between the stored position and the operating position based on the status of the vehicle door determined to be in the open position; and
   preventing movement of the deck between the stored position and the operating position based on the status of the vehicle door determined to be in the closed position.

8. The method of claim 7, further comprising generating an alert if at least one or more of the following conditions is determined:
   a body is detected on the deck;
   movement of the deck is detected between a lowered position and a raised position; or
   the deck is detected, via the sensor, at a predetermined elevation.

9. The method of claim 7, further including determining a position of a dock door, and preventing movement of the deck between the stored position and the operating position when the position of the dock door is determined to be in a closed position.

10. The method of claim 7, further comprising detecting a position of a lip of the deck via the sensor.

11. The method of claim 10, further comprising causing the lip of the deck to extend when the deck is detected at a predetermined elevation.

12. A method comprising:
   receiving, via a sensor positioned at a loading dock, sensor data related to the loading dock, the sensor data including a status of a rear cargo door of a vehicle;
   determining, using a processor receiving a signal from the sensor, the status of the vehicle door, the status being at least one of a closed position or an open position, and
   causing a deck to move between a stored position and an operating condition based on the status of the vehicle door.

13. The method of claim 12, wherein the sensor data further includes at least one or more of a position of the deck, a position of a dock door of the loading dock, a position of a loading surface of the vehicle, or a presence of a body on the deck.

14. The method of claim 12, further comprising controlling at least one of the deck or a lip of the deck based on the condition of the deck.

15. The method of claim 14, wherein controlling at least one or more of the deck or the lip of the deck is further based on at least one of a detected presence or a detected position of a vehicle by the sensor.

16. The method of claim 12, further comprising detecting a presence or a distance of the vehicle relative to the loading dock.

17. The method of claim 12, further comprising generating an alert based on at least one or more of the following conditions of the deck:
   a body is detected on the deck;
   movement of the deck is detected toward an elevated position; or
   detection of the deck at a predetermined position.

18. The method of claim 12, wherein the sensor is positioned near a horizontal surface of the deck corresponding to when the deck is in an un-deployed state.

19. The method of claim 12, wherein the condition of the deck is further based on whether the vehicle is present.

* * * * *